United States Patent [19]

Fernholz et al.

[11] 3,899,539

[45] Aug. 12, 1975

[54] PROCESS FOR THE PREPARATION OF PROPIONALDEHYDE

[75] Inventors: Hans Fernholz, Fischbach, Taunus; Friedrich Wunder, Florsheim, Main; Hans-Joachim Schmidt, Frankfurt am Main, all of Germany

[73] Assignee: Hoechst Aktiengesellschaft, Frankfurt am Main, Germany

[22] Filed: Apr. 27, 1971

[21] Appl. No.: 137,944

[30] Foreign Application Priority Data

Apr. 29, 1970 Germany............................ 2020890

[52] U.S. Cl.............. 260/601 R; 252/432; 252/437; 252/439; 252/449; 252/458
[51] Int. Cl.²........................................ C07C 41/02
[58] Field of Search..................... 260/601 R, 497 A

[56] References Cited
UNITED STATES PATENTS

| | | | |
|---|---|---|---|
| 1,714,783 | 5/1929 | Hermann et al. | 260/601 R |
| 2,106,347 | 1/1938 | Groll et al. | 260/601 R |
| 2,441,540 | 5/1948 | Ash et al. | 260/601 R |
| 3,190,912 | 6/1965 | Robinson | 260/497 A |

OTHER PUBLICATIONS

Kagan "Chem. Abstracts," Vol. 50, p. 14334 (1956).

Tanabe "Solid Acids and Bases" Academic Press, New York, N.Y., 1970, pp. 116, 117, 122 and 123.

Primary Examiner—Donald G. Daus
Assistant Examiner—D. B. Springer
Attorney, Agent, or Firm—Curtis, Morris & Safford

[57] ABSTRACT

A process for the preparation of propionaldehyde by reacting carboxylic acid allyl esters in the gaseous phase, while using acid catalysts, in the presence of water.

10 Claims, No Drawings

PROCESS FOR THE PREPARATION OF PROPIONALDEHYDE

The present invention relates to a process for the preparation of propionaldehyde.

It has been proposed to prepare propionaldehyde by reacting ethylene with carbon monoxide and hydrogen in the presence of cobaltiferous catalysts at elevated temperature and at a pressure of up to 200 atmospheres gage in accordance with the oxo-synthesis. Under these conditions, however, the resulting propionaldehyde is easily converted into higher condensed products, so that the yield of propionaldehyde is generally only of from 70 to 80%, calculated on the ethylene reacted. Further known processes for the preparation of propionaldehyde are based on the rearrangement of propylene oxide at a temperature of from 250° to 300°C, as well as on the dehydration of n-propanol using catalysts containing copper or zinc sulfide at a temperature of about 400°C. However, with these processes, too, by-products, such as acetone or propylidene-dipropyl-acetal, are obtained.

Furthermore, the preparation of propionaldehyde by an intramolecular rearrangement of allyl alcohol in the gaseous phase has been described. As catalysts for this rearrangement there are used oxidic catalysts, such as aluminum oxide, aluminum silicate, zinc oxide, and heavy metal oxides. Their activity generally rises with an increasing alkalinity. However, they show a poor selectivity with minor space-time-yields and form fairly large amounts of by-products, such as acroleine, diallyl ether, and carbon oxides.

There have also been proposed metals, for example copper, as catalysts for the rearrangement of allyl alcohol. They have the drawback that they involve a strong deposit of resinous products, that they show a rapid loss of activity and thus have only a short lifetime as catalyst. The rearrangement of allyl alcohol can also be effected in the presence of metal carbonyls, for example iron penta-carbonyl, however, the yield of propionaldehyde is rather small with this process, too, since in most cases a larger proportion of higher condensed aldehyde mixtures is formed.

The present invention provides a process for the preparation of propionaldehyde, which comprises reacting carboxylic acid allyl esters having up to 12 carbon atoms in the molecule in the presence of from 1 to 10 moles, preferably from 2 to 8 moles of water per mole of carboxylic acid allyl ester, at a temperature of between 75° and 300°C, preferably of from 150° to 250°C, in the gaseous phase in the presence of acid catalysts which preferably contain polybasic acids.

It was surprising and could not have been foreseen that carboxylic acid allyl esters react hydrolytically in the presence of water and acid catalysts, to form propionaldehyde and carboxylic acid with an elevated rate of conversion and high yields, with an intramolecular isomerization taking place at the same time, as it is known that in the presence of non-metallic catalysts, the isomerization of allyl alcohol proceeds the better, the more basic the oxide used.

The effect of the acid catalysts in the process of the invention is to be attributed to the fact that they catalyze the hydrolysis of carboxylic acid allyl esters and simultaneously change the allyl alcohol formed in situ into the isomeric propionaldehyde.

Acid catalysts suitable for the process of the present invention are simple or complex acids which are hardly volatile, such as orthophosphoric acid, pyrophosphoric acid, polyphosphoric acids, sulfonic acids, silicotungstic acid, phosphomolybdic acid, boro-tungstic acid, phospho-tungstic acid, phospho-tungstic-molybdic acid, or their mixtures. Preference is given to acid catalysts which have been applied to inert carriers, and which contain from 1 to 40 % by weight, preferably from 10 to 30 % by weight of phosphoric acid, calculated on the dry weight of the catalytic system. As carriers there may be used a great variety of inert materials, such as silicic acid, silica gel, carbon, aluminum oxide, silicates, such as burned clay, aluminum silicates, silicon carbide, zirconium or their mixtures.

The catalysts can be prepared in many different ways, for example by pelleting powders, by impregnating or spraying pre-shaped inert carriers with the catalytically active acid, or by mixing the acid with a lubricant, such as graphite, and a binding agent, such as kaolin or polyvinyl alcohol, subsequent pelleting and, optionally, glowing of the catalyst, or else — if the heteropoly-acids are used — by preparation from the oxides, drying of the oxide precipitate, and subsequent comminution.

As carboxylic acid allyl esters there may be used the allyl esters of carboxylic acids of the aliphatic, cycloaliphatic, araliphatic or aromatic series having one or several carboxylic groups. The respective carboxylic acid allyl ester should be vaporizable under the reaction conditions. It should therefore not have more than 12 carbon atoms. Preference is given to the allyl esters of unsubstituted aliphatic monocarboxylic acids having from 2 to 4 carbon atoms, for example allyl acetate, allyl propionate, allyl isobutyrate, allyl butyrate, or their mixtures.

In order to carry out the process of the present invention, the carboxylic acid allyl ester is vaporized together with from 1 to 10 moles, preferably from 2 to 8 moles of water per mole of carboxylic acid allyl ester, and the vaporous mixture of water and carboxylic acid allyl ester is guided, at a temperature of between 75°C and 300°C, preferably between 150°C and 250°C, over the catalyst which may be used in the form of a fixed bed catalyst, as well as in the form of a fluid bed catalyst. Suitable catalysts for the use as fixed bed catalysts are those in the form of pellets, balls, extruded pieces or granules; for the use as fluid bed catalysts, there are suitable those having a particle diameter of between 1 and 0.01 mm. The reaction mixture leaving the reaction zone is separated into its components by fractional distillation. Allyl acetate which has not been reacted, as well as allyl alcohol that has been formed during the reaction by hydrolysis, may be used again as starting material or may be admixed with fresh starting material.

The reaction is largely independent of the reaction pressure. It is therefore possible to effect the reaction under normal pressure as well as under reduced or elevated pressures. The only pre-requisite is that the components can be vaporized without decomposition under the reaction conditions. The reaction is preferably effected at a pressure of from 1 to 10 atmospheres. It may be advantageous to effect the vaporization of the starting substances and the reaction to form propionaldehyde in the presence of an inert gas, such as nitrogen or carbon dioxide.

Another variant of the process of the present invention consists in compensating a possible minor volatility of the catalytically active acid by vaporizing a corresponding amount of the acid together with the initial components and thus feeding it back to the catalyst.

The advantages of the process of the present invention are that an excellent selectivity and good yields of propionaldehyde are obtained with high space-time yields of the catalyst and that the carboxylic acid allyl esters used as starting material are particularly easily available, due to recently developed processes, which makes them rather inexpensive.

The following Examples serve to illustrate the invention, the parts and percentages being by weight unless otherwise stated.

EXAMPLE 1

976 parts of a silicic acid carrier in the form of balls (diameter 3–5 mm) were impregnated with 232 parts of phosphoric acid of 85 % strength and were subsequently dried. 500 ml of the catalyst thus obtained were filled into a reactor that may be heated, then a gaseous mixture of 60 g of acetic acid allyl ester, 60 g of water, and 84 Nl (N meaning under normal conditions of pressure and temperature) of nitrogen was guided over the catalyst per hour at normal pressure and at a temperature of the catalyst of 200°C. The condensate contained 26.4 % of propionaldehyde, 28.5 % of acetic acid, 2.1 % of allyl alcohol, and 2.5 % of allyl acetate, which corresponded to a catalyst yield of about 63 g of propionaldehyde per liter of catalyst per hour, and a yield of propionaldehyde of 95 %, calculated on the acetic acid allyl ester reacted. By-products, such as acroleine, diallyl ether or carbon oxides could not be detected in the condensate and/or the exhaust gas.

EXAMPLE 2

400 parts of a silicic acid carrier in cylinder form were impregnated with 118 parts of phosphoric acid of 85 % strength and were dried. 180 g of acetic acid allyl ester, 180 g of water and 250 Nl of nitrogen were guided per hour over 500 ml of this catalyst in an autoclave at a pressure of 5 atmospheres gage and at a temperature of 180°C. The condensate obtained was composed on the average of 26.6 % of propionaldehyde, 28.6 % of acetic acid, 2.5 % of acetic acid allyl ester, and 0.8 % of allyl alcohol, which corresponded to an output of 192 g of propionaldehyde per liter of catalyst per hour, and a yield of propionaldehyde of 97 %, calculated on the acetic acid allyl ester reacted.

EXAMPLE 3

205 g of propionic acid allyl ester, 180 g of water, and 250 Nl of nitrogen were guided per hour over 500 ml of the catalyst described in Example 1 at a pressure of 5 atmospheres gage and a temperature of 200°C. With a rate of conversion of 89 %, 171 g of propionaldehyde were obtained per liter of catalyst per hour, the yield of propionaldehyde being 92 %, calculated on the propionic acid allyl ester reacted. 8 % of the allyl ester were hydrolyzed to form allyl alcohol.

EXAMPLE 4

A gaseous mixture of 91 g of benzoic acid allyl ester, 50 g of water, and 80 Nl of nitrogen was guided per hour over 500 ml of the catalyst described in Example 1 at a pressure of 3 atmospheres gage and a temperature of 200°C. In this process, 70 % of the benzoic acid allyl ester used were reacted. The yield of propionaldehyde was 83 %, calculated on the benzoic acid allyl ester reacted, 38 g of propionaldehyde were obtained per liter of catalyst per hour.

EXAMPLE 5

A suspension of 185 g of phospho-molybdic acid in 400 ml of water was added to 740 g of a silicic acid carrier in the form of balls, and the mixture was dried at 60°C. 180 g of acetic acid allyl ester, 180 g of water and 250 Nl of nitrogen were guided per hour over 500 ml of the catalyst thus obtained at a pressure of 5 atmospheres gage and at a temperature of 200°C. With a rate of conversion of 73.5 %, 68 g of propionaldehyde were obtained per hour, which corresponded to 88.8 %, calculated on the acetic acid allyl ester reacted, and a space-time-yield of 136 g of propionaldehyde per liter of catalyst per hour.

What is claimed is:

1. A process for the preparation of propionaldehyde, which comprises the step of reacting a saturated carboxylic acid allyl ester wherein said saturated carboxylic acid is free of further functional groups and having up to 12 carbon atoms in the molecule, in the presence of from 1 to 10 moles of water per mole of carboxylic acid allyl ester at a temperature of between 75°C and 300° from in the gaseous phase and in the presence of an acid catalyst selected from the group consisting of orthophosphoric acid, pyrophosphoric acid, polyphosphoric acids, silico-tungstic acid, phosphomolybdic acid, borotungstic acid, and phospho-tungstic acid, phospho-tungstic-molybdic acid and mixtures thereof.

to 8 moles of water are used per mole of carboxylic acid allyl ester.

3. A process as claimed in claim 1, wherein the reaction is carried out at a temperature of between 150°C and 250°C.

4. A process as claimed in claim 1, wherein the catalyst contains polybasic acids.

5. A process as claimed in claim 1, wherein the catalyst is supported on an inert carrier.

6. A process as claimed in claim 5, wherein a catalyst is used which contains from 1 to 40 % by weight of phosphoric acid, calculated on the total weight of the catalytic system consisting of the carrier and phosphoric acid.

7. A process as claimed in claim 5, wherein a catalyst is used which contains from 10 to 30 % by weight of phosphoric acid, calculated on the total weight of the catalytic system consisting of the carrier and phosphoric acid.

8. A process as claimed in claim 1, wherein the reaction is carried out at a pressure of from 1 to 10 atmospheres.

9. A process as claimed in claim 1, wherein the carboxylic acid allyl ester is reacted in the presence of an inert gas.

10. A process as claimed in claim 1, wherein an allyl ester of a staturated monocarboxylic acid having from 2 to 4 carbon atoms is used.

* * * * *